United States Patent
Ma

(10) Patent No.: US 12,133,013 B2
(45) Date of Patent: Oct. 29, 2024

(54) VIDEO SPECIAL EFFECT CONFIGURATION METHOD, DEVICE, EQUIPMENT AND STORAGE MEDIUM

(71) Applicant: BEIJING BYTEDANCE NETWORK TECHNOLOGY CO., LTD., Beijing (CN)

(72) Inventor: Ruifeng Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/991,626

(22) Filed: Nov. 21, 2022

(65) Prior Publication Data

US 2023/0091942 A1    Mar. 23, 2023

Related U.S. Application Data

(63) Continuation of application No. PCT/CN2021/094874, filed on May 20, 2021.

(30) Foreign Application Priority Data

May 21, 2020   (CN) .......................... 202010438282.9

(51) Int. Cl.
  *H04N 5/262*   (2006.01)
  *G06V 20/40*   (2022.01)
(52) U.S. Cl.
  CPC ........... *H04N 5/2621* (2013.01); *G06V 20/44* (2022.01)
(58) Field of Classification Search
  CPC .............. G06F 3/0482; G06F 3/04845; G06F 3/04847; G06F 9/451; G06T 11/60;
  (Continued)

(56) References Cited

U.S. PATENT DOCUMENTS

2007/0296734 A1   12/2007   Ekpar

FOREIGN PATENT DOCUMENTS

CN   102779028 A      11/2012
CN   106341720 A  *   1/2017    ......... H04N 21/4312
(Continued)

OTHER PUBLICATIONS

International Search Report and Written Opinion issued in International Patent Application No. PCT/CN2021/094874 on Jun. 28, 2021.
(Continued)

*Primary Examiner* — Antoinette T Spinks
(74) *Attorney, Agent, or Firm* — Astute IP Law Group

(57) ABSTRACT

The present disclosure provides video special effect configuration method, device, equipment and storage medium, and relates to the technical field of special effect processing. The method includes: adding a variable update node in a first special effect event combination in response to a first setting operation of a user, in which an update manner of a target variable is set on the variable update node; adding a variable trigger node in a second special effect event combination in response to a second setting operation of the user, in which a judging condition of the target variable is set on the variable trigger node; and generating a configuration file of a video special effect according to the first and second special effect event combinations. The technical solution of the present disclosure allows the production of the video special effect to better fit in the action changes of the user.

18 Claims, 3 Drawing Sheets

(58) Field of Classification Search
CPC ...... H04N 5/2621; H04N 5/262; G06V 20/44; G06V 40/174; G11B 27/031; G11B 27/34
USPC ........................................................ 348/239
See application file for complete search history.

(56) References Cited

FOREIGN PATENT DOCUMENTS

| | | | |
|---|---|---|---|
| CN | 107592474 | A | 1/2018 |
| CN | 108711180 | A | 10/2018 |
| CN | 109343778 | A | 2/2019 |
| CN | 110147231 | A | 11/2021 |
| CN | 110611776 | A | 5/2022 |
| CN | 113709383 | B | 5/2024 |
| JP | 2014044655 | A | 3/2014 |
| JP | 7516561 | B2 | 7/2024 |

OTHER PUBLICATIONS

Extended European Search Report in EP21808113.1, mailed Jul. 14, 2023, 9 pages.

* cited by examiner

VIDEO SPECIAL EFFECT CONFIGURATION METHOD, DEVICE, EQUIPMENT AND STORAGE MEDIUM

This application is a continuation of International Application No. PCT/CN2021/094874 filed on May 20, 2021, which claims priority to Chinese Patent Application No. 202010438282.9 filed May 21, 2020, the disclosure of which is incorporated herein by reference as a part of the application.

TECHNICAL FIELD

The present application relates to the technical field of special effect processing, in particular to video special effect configuration method, device, equipment and storage medium.

BACKGROUND

In order to increase the interaction of videos, a trigger action (including a face action and a body action) and a correspondingly triggered special effect element are set in a special effect event combination of a special effect making tool.

SUMMARY

The summary section is provided to introduce the concept in a brief form, which will be described in detail in the following detailed description section. The summary is not intended to identify a key feature or an essential feature of the claimed technical solution, nor is it intended to limit the scope of the claimed technical solution.

In the first aspect, an embodiment of the present disclosure provides a video special effect configuration method, which comprises the following steps: adding a variable update node in a first special effect event combination in response to a first setting operation of a user, in which an update manner of a target variable is set on the variable update node; adding a variable trigger node in a second special effect event combination in response to a second setting operation of the user, in which a judging condition of the target variable is set on the variable trigger node; generating a configuration file of a video special effect according to the first special effect event combination and the second special effect event combination, the configuration file is used for indicating displaying of the video special effect on a target video: in a displaying process of the video special effect, the target variable is updated according to the update manner when the first special effect event combination is executed to satisfy the variable update node, and the second special effect event combination is triggered and executed by taking the variable trigger node as a starting point when the target variable satisfies the judging condition.

In the second aspect, an embodiment of the present disclosure provides a video special effect configuration device, which comprises: a variable update module, configured to add a variable update node in a first special effect event combination in response to a first setting operation of a user, in which an update manner of a target variable is set on the variable update node; a variable trigger module, configured to add a variable trigger node in a second special effect event combination in response to a second setting operation of the user, in which a judging condition of the target variable is set on the variable trigger node; and a configuration module, configured to generate a configuration file of a video special effect according to the first special effect event combination and the second special effect event combination, and the configuration file is used for indicating displaying of the video special effect on a target video: in a displaying process of the video special effect, the target variable is updated according to the update manner when the first special effect event combination is executed to satisfy the variable update node, and the second special effect event combination is triggered and executed by taking the variable trigger node as a starting point when the target variable satisfies the judging condition.

In the third aspect, an embodiment of the present disclosure provides a computer equipment, the computer equipment comprises a memory, a processor and computer programs stored in the memory and capable of running on the processor, and steps of the video special effect configuration method according to any embodiment of the first aspect are implemented when the processor executes the programs.

In the fourth aspect, an embodiment of the present disclosure provides a storage medium comprising computer executable instructions, the computer executable instructions are used for executing steps of the video special effect configuration method according to any embodiment of the first aspect when being executed by a computer processor.

Additional aspects and advantages of the present disclosure will be set forth in part in the following description, which will be obvious from the following description, or may be learned by practice of the present disclosure.

BRIEF DESCRIPTION OF THE DRAWINGS

The above and/or additional aspects and advantages of the present application will become apparent and easy to understand from the following description of embodiments in conjunction with the accompanying drawings, in which.

DETAILED DESCRIPTION

Figure 1:
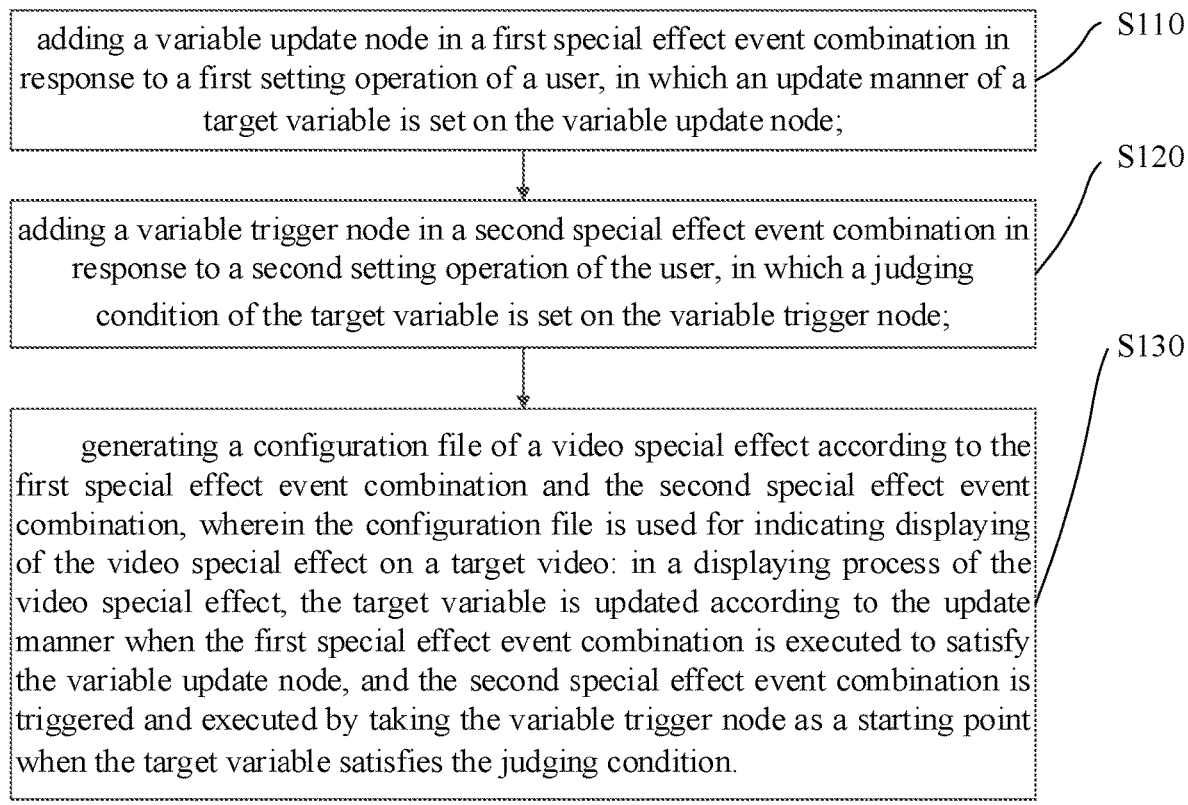
FIG. 1 is a schematic flow diagram of a video special effect configuration method provided by an embodiment of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth here. On the contrary, these embodiments are provided for a more thorough and complete understanding of the present disclosure. It should be understood that the drawings and embodiments of the disclosure are only for illustrative purposes, and are not intended to limit the protection scope of the disclosure.

It should be understood that the steps described in the method embodiments of the present disclosure may be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "at least partially based on". The term "one embodiment" means "at least one embodiment"; the term "another embodiment" means "at least one other embodiment"; the term "some embodiments" means "at least some embodiments". Relevant definitions of other terms will be given in the following description.

It should be noted that the concepts of "first" and "second" mentioned in the disclosure are only used to distinguish devices, modules or units, and are not used to limit that these devices, modules or units must be different devices, modules or units, nor to limit the order or interdependence of the functions performed by these devices, modules or units.

It should be noted that the modification "one" and "a plurality" mentioned in this disclosure are illustrative rather than restrictive, and those skilled in the art should understand that unless the context clearly indicates otherwise, they should be understood as "one or more".

The names of interactive messages or information between a plurality of devices in the embodiment of the present disclosure are for illustrative purposes only and should not restrict the scope of the messages or information.

In general, there is no correlation between special effect event combinations, so there is no correlation between trigger executions obtaining trigger actions of the special effect event combinations, thereby which limits the making of video special effect. Therefore, the effect of the video special effect cannot be further improved, and the enthusiasm of users in video recording can be affected.

The video special effect configuration method, device, equipment and storage medium provided by the present disclosure aim to solve the above technical problems in the prior art.

The video special effect configuration method, device, equipment and storage medium provided by the present disclosure connect a variable update node and a variable trigger node according to the same target variable by utilization of the addition of the setting of the update manner and the setting of a judging condition on the same target variable on the variable update node and the variable trigger node respectively, so as to correlate a first special effect event combination and a second special effect event combination provided with the variable update node and the variable trigger node. Therefore, in the display process of video special effect, the display manner of the video effect is updated according to the update of the target variable, and the transformation manner of the video special effect is added, which is favorable for expanding the making space of the video special effect and helpful for improving the enthusiasm of users in video recording.

Detailed description will be given below to the technical solution of the present disclosure and how to solve the above technical problems by the technical solution of the present disclosure with reference to specific embodiments. The following several specific embodiments can be combined with each other, and same or similar concepts or processes may be not further described in some embodiments. Description will be given below to the embodiments of the present disclosure with reference to the drawings.

The video special effect configuration method provided by the embodiment of the present disclosure can be applied in a terminal for video special effect developing.

Referring to FIG. 1, FIG. 1 is a schematic flow diagram of a video special effect configuration method provided by an embodiment of the present disclosure.

The embodiment of the present disclosure provides a video special effect configuration method, which can be applied to video special effect design terminals. The method may comprise:

S110: adding a variable update node in a first special effect event combination in response to a first setting operation of a user, in which the update manner of a target variable is set on the variable update node.

Figure 2:
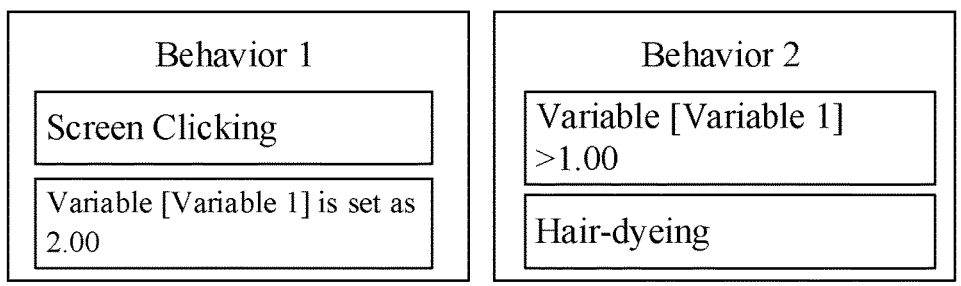
FIG. 2 is a schematic diagram of a making interface of a video special effect configuration method provided by an embodiment.

The first special effect event combination and a second special effect event combination are added on an operation page of a special effect making tool in response to the operation of the user. As shown in FIG. 2 which includes blocks named "Behavior 1" and "Behavior 2", "Behavior 1" refers to the first special effect event combination and "Behavior 2" refers to the second special effect event combination.

The special effect making tool sends an instruction of the first setting operation according to a variable setting selected by the user in the first special effect event combination named "Behavior 1", and a terminal for running the special effect making tool adds the variable update node in the first special effect event combination named "Behavior 1" in response to the first setting operation. Moreover, the update manner of the target variable is set for the variable update node. The update manner is used for limiting the numerical range of the target variable and/or the change manner of the value.

As shown in FIG. 2, the variable update node is set as variable [variable 1]. Wherein, the variable [variable 1] refers to the target variable. Setting of the variable [variable 1] is to determine the update manner of the target variable in the first special effect event combination named "Behavior 1", and the target variable is updated according to the update manner when the first special effect event combination is executed to satisfy the variable update node.

S120: adding a variable trigger node in the second special effect event combination in response to a second setting operation of the user, in which a judging condition of the target variable are set on the variable trigger node.

As for the second special effect event combination named "Behavior 2", the user selects the variable setting in the second special effect event combination named "Behavior 2" and sends an instruction of the second setting operation to the terminal, and the terminal adds the variable trigger node in the second special effect event combination named "Behavior 2" in response to the second setting operation. The judging condition of the target variable in the step S110 is set for the variable trigger node.

As shown in FIG. 2, the same target variable in the step S110 of the variable trigger node is set as variable [variable 1].

After updating the target variable when the first special effect event combination is executed to satisfy the variable update node based on the update manner in the step S110 according to the setting of the variable [variable 1] in the second special effect event combination named "Behavior 2", when the updated target variable is determined to satisfy the judging condition according to the judging condition, the second special effect event combination is triggered and executed by taking the variable trigger node as a starting point.

The target variable is updated according to the update manner when the first special effect event combination is executed to satisfy the variable update node. If the target variable is updated, whether the target variable satisfies the judging condition is determined.

More specially, after updating the target variable each time, the second special effect event combination acquires the updated target variable and determines whether the updated target variable satisfies the judging condition of the variable trigger node, so as to subsequently determine whether to add the setting of corresponding special effect elements for the target variable.

S130: generating a configuration file of the video special effect according to the first special effect event combination and the second special effect event combination.

A character string corresponding to the first special effect event combination and the second special effect event combination is formed by adding settings to the same variable, the [variable 1] as shown in FIG. 2, of the variable update node and the variable trigger node in the first special effect event combination and the second special effect event combination respectively according to the step S110 and the step S120. The configuration file of the video special effect is generated according to the character string.

Wherein, the configuration file is used for indicating the display of the video special effect on a target video: in the display process of the video special effect, the target variable is updated according to the update manner when the first special effect event combination is executed to satisfy the variable update node, and the second special effect event combination is triggered and executed by taking the variable trigger node as a starting point when the target variable satisfies the judging condition.

Wherein, the judging condition may be specifically that: the target variable is within the preset value range. When the first special effect event combination is executed to satisfy the variable update node, whether the updated target variable is within the preset value range is determined.

In the embodiment, the configuration file may be applied to an application for recording the target video. The target video acquired by the application is subjected to video special effect processing by selecting a configuration file with specific video special effect or video special effect combination on the application according to special effect requirements of the user on the target video.

The above embodiment connects the variable update node and the variable trigger node according to the same target variable by utilization of the addition of the setting of the update manner and the setting of the judging condition on the same target variable on the variable update node and the variable trigger node respectively, so as to correlate the first special effect event combination and the second special effect event combination provided with the variable update node and the variable trigger node. Therefore, in the display process of the video special effect, the display manner of the video effect is updated according to the update of the target variable, and the transformation manner of the video special effect is added, which is favorable for developing the making space of the video special effects and helpful for enhancing the enthusiasm of the users in video recording.

On this basis, the video special effect configuration method further comprises:

Adding a trigger action node in the first special effect event combination in response to a third setting operation of the user, in which the trigger action node is the previous node of the variable update node.

In the embodiment, the trigger action node is set before the variable update node.

In the display process of the video special effect, when the first special effect event combination is executed to a first associated node, the second special effect event combination is triggered and executed by taking a second associated node as a starting point if the setting of the trigger action of the trigger action node corresponding to the first associated node is satisfied.

In the embodiment, the trigger action node is a node of an identification element or a detection element of a trigger action or a trigger operation set by the user according to trigger requirements of triggering the video special effect. If the trigger action is the identification element, e.g., a video image such as a face action and a body action, in the identification element, corresponding trigger action may be formed by acquiring images of the face action or the body action of the user. For example, a face model not with corresponding face action is entered on the terminal, and corresponding location region limitation is done for the five sense organs without corresponding face action in the face model. If the change of a region where corresponding organ is located is acquired, it is determined that the acquired user does corresponding face action. For example, corresponding to the face action "mouth opening", when a region where the lips are located exceeds a region of original mouth-closing, it is identified that the user does "mouth opening" face action according to coordinate change of the lip region.

If the trigger action is the detection element, e.g., starting video shooting, built-in video special effect or the end of sticker exposure, for example, as for starting video shooting, a shooting start instruction of a video or a login instruction of corresponding video shooting start application is taken as a trigger action and prestored.

Corresponding face action and body action of a video image are acquired on the target video, or acquiring an operation instruction of the terminal of the target video, and when the trigger action node which is set corresponding to the variable update node is satisfied, the obtained target variable is acquired when the trigger action setting of the trigger action node is satisfied. And whether the target variable satisfies the judging condition is further determined. If satisfied, the next node of the variable trigger node is continuously executed according to the execution sequence of the nodes.

The target variable of the step S110 is set as a first fixed value. As shown in FIG. 2, the [variable 1] corresponding to the variable update node is set as 2.00.

In the embodiment, when the first special effect event combination is executed to satisfy the variable update node, the target variable is updated according to the update manner that the variable is set as 2.00. If an initial value of the target variable is 0, an update result that the value of the target variable is 2.00 is obtained according to the change of the update manner. Whether the update result of the target variable satisfies the judging condition of the variable trigger node is further determined according to the update result. The update result that the value of the target variable is 2.00 satisfies the judging condition: variable [variable 1]>1.00. Moreover, according to the above judging condition, if the target variable is changed again, the obtained updated target variable also satisfies the judging condition: variable [variable 1]>1.00. A video special effect of hair-dyeing corresponding to the trigger variable can be triggered according to the judging condition.

On this basis, the trigger action node is added in the first special effect event combination and at the previous node of the variable update node. In the display process of the video special effect, when an operation of clicking on the screen of the user is acquired and the setting condition of the trigger action of the trigger action node is satisfied, corresponding target variable may be changed. Moreover, a first fixed value is obtained according to the setting, and the updated target variable is obtained.

In the embodiment, the updated target variable may be obtained according to the update manner even if there is no user-related video special effect configuration guidance; the updated target variable is compared with the determination range of the trigger variable node; and corresponding video special effect can be easily triggered according to the updated target variable in the recorded video, so as to increase the adhesion of the users in recording and making special effect videos.

Figure 3:
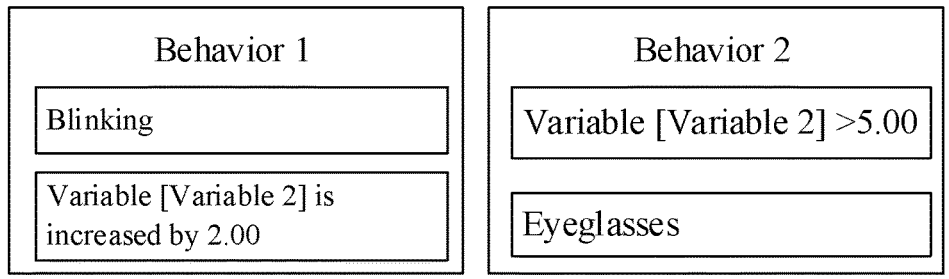
FIG. 3 is a schematic diagram of a making interface of a video special effect configuration method provided by an embodiment.
Figure 4:
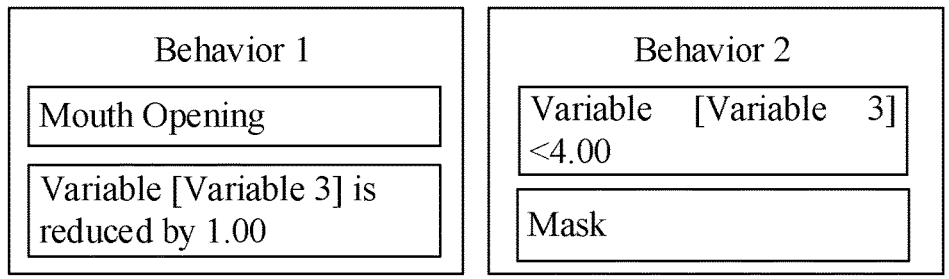
FIG. 4 is a schematic diagram of a making interface of a video special effect configuration method provided by an embodiment.

The target variable of the step S110 is set as the accumulation or subtraction of a second fixed value. As shown in FIGS. 3-4, the [variable 1] corresponding to the variable update node is increased by 2.00, or the [variable 1] is reduced by 1.00.

Referring to FIG. 3, FIG. 3 is a schematic diagram of a making interface of a video special effect configuration method provided by an embodiment.

In the embodiment, when the first special effect event combination is executed to satisfy the variable update node, the target variable is updated according to the update manner of increasing the target variable by 2.00 in succession. The target variable is all updated by adding 2.00 in every change. If the initial value of the target variable is set as 0, corresponding target variable is 2.00 after first update. Corresponding target variable is 4.00 in the case of second update. Moreover, whether the updated target variable satisfies the judging condition is further determined.

In the embodiment, a "blinking" trigger action node is added in the first special effect event combination and the previous node of the variable update node.

Trigger action of every blinking of the user is obtained by recognition, and a second fixed value is accumulated to the target variable, namely an execution operation of adding 2.00.

When the updated target variable is equal to 2.00 or 4.00, the updated target variable still cannot satisfy the judging condition of the variable trigger node. At this point, the variable trigger node cannot be executed. The judging condition of the variable trigger node can only be satisfied when the updated target variable is more than or equal to 6, so that the first special effect event combination "Behavior 1" and the second special effect event combination "Behavior 2" are correlated. Subsequently, a video special effect of "eyeglasses" is triggered and added to the video image according to the trigger setting. The "eyeglasses" video special effect may be loaded to the region according to the region recognition of the eyes of the face when added to the video image.

In the embodiment, the target variable after every update is acquired according to the accumulated second fixed value, and the first special effect event combination "Behavior 1" and the second special effect event combination "Behavior 2" are correlated according to the result of comparing the target variable after the last update with the preset value range of the judging condition, so as for the subsequent setting and trigger of corresponding video special effect.

In the configuration file generated by the embodiment, in the process of video recording, the target variable after the last update is obtained after determining that the target variable is changed according to the cycle according to the change of the acquired target variable or the change of the target variable caused by the number of trigger actions of the user, and corresponding video special effect is continuously triggered according to the result whether the target variable after the last update satisfies the judging condition. Therefore, recorded video frames can fit in a plurality of trigger actions of the user, and video frames can be constantly enriched in the process of making special effect video. Thus, the enthusiasm of the users in video recording can be improved.

On this basis, in the display process of the video special effect, if the target variable is updated, the updated target variable is displayed.

According to the settings of the configuration file generated by the embodiment, when the user executes the configuration file generated by the embodiment, the updated target variable satisfying the judging condition is displayed on the video frame of the recorded video according to the trigger action of the user such as blinking. The generated configuration file can be applied to a human-computer interaction scoring game which calculates and displays corresponding score of the user according to trigger action of the user.

Referring to FIG. 4, FIG. 4 is a schematic diagram of a making interface of a video special effect configuration method provided by an embodiment.

In the embodiment, when the first special effect event combination is executed to satisfy the variable update node, the target variable is updated in the update manner of reducing the target variable by 1 in succession according to the fact that the set variable [variable 3] of the target variable is reduced by 1.00. That is to say, the target variable is updated by reducing 1 after every change.

More specifically, the judging condition of the variable update node is that the variable [variable 3] is reduced by 1.00, namely corresponding reduced variable is 1.00. When the target variable changes every time, corresponding variable value is changed according to the setting of the reduced variable, and the target variable is reduced by 1.00. If the initial value of the target variable is set as 5.00, corresponding target variable value is 4.00 after first update on the target variable, and corresponding target variable is 3.00 after second update, until the updated target variable satisfies the judging condition of the variable.

In the embodiment, a "mouth opening" trigger action node is added in the first special effect combination and the previous node of the variable update node.

The mouth-opening trigger action of the user every time is obtained by recognition, and an execution operation of reducing the target variable by a second fixed value, namely 1.00, is performed.

Based on the setting that the initial value is 5.00, if the target variable is equal to 5.00 or 4.00, the target variable still cannot satisfy the trigger range of the trigger variable. At this point, the judging condition cannot be satisfied. The judging condition of the variable trigger node can only be satisfied when the target variable is one value of 3.00, 2.00, 1.00 and 0, namely the variable value is less than 4.00, and then the first special effect event combination and the second special effect event combination are correlated. Subsequently, a video special effect of "mask" is triggered and added to the video image according to the trigger setting.

In the embodiment, the target variable after every update is acquired according to the reduced second fixed value, and the first special effect event combination "Behavior 1" and the second special effect event combination "Behavior 2" are correlated according to the result of comparing the target variable after every update with the preset value range of the judging condition, so as for the subsequent setting and trigger of corresponding video special effect.

In the configuration file generated by the embodiment, in the process of video recording, the target variable after the last update is obtained after determining that the target variable is changed according to the cycle according to the change of the acquired target variable or the change of the target variable caused by the number of trigger actions of the user, and corresponding video special effects are continuously triggered according to the result whether the target variable after the last update satisfies the judging condition. Therefore, recorded video frames can fit in a plurality of trigger actions of the user, and video frames can be constantly enriched in the process of making special effect video. Thus, the enthusiasm of the users in video recording can be improved.

On this basis, in the display process of the video special effect, if the target variable is updated, the updated target variable is displayed.

In the video special effect configuration method provided by the embodiment, when the user executes the configuration file generated by the embodiment, the updated target variable that satisfies the judging condition is displayed on the video frame of the recorded video based on the setting according to the trigger action of the user such as mouth opening. The generated configuration file may be applied to a countdown scene, and the current countdown state is displayed according to the "mouth opening" trigger action of the user when the user opens the mouth to shout the countdown number.

In the above embodiment, in the process of accumulating or subtracting the second fixed value from the target variable, the second fixed value may also be negative integer, decimal and other numerical types except positive integer.

In the configuration file generated by the above embodiment, corresponding special effect element is set and triggered according to the result whether the updated target variable satisfies the judging condition. Thus, the configuration file generated by the method may create corresponding video special effect according to continuous or intermittent trigger actions of the user, so that the user can finish more trigger actions. Therefore, the adhesion of the user can be improved, and the enthusiasm of the user in participating in creating special effect video can be improved.

The configuration file generated by the embodiment of accumulating the above satisfied trigger action nodes can apply special effect making of short video, wherein the updated target variable is obtained by the accumulative operation in the same video recording.

If a plurality of trigger action nodes are set in the first special effect event combination, the trigger action nodes are successively arranged.

Before the step of setting a determination variable for the trigger action node, the method further comprises:

acquiring the trigger action nodes successively in the first special effect event combination when determining the occurrence of the trigger action.

Figure 5:
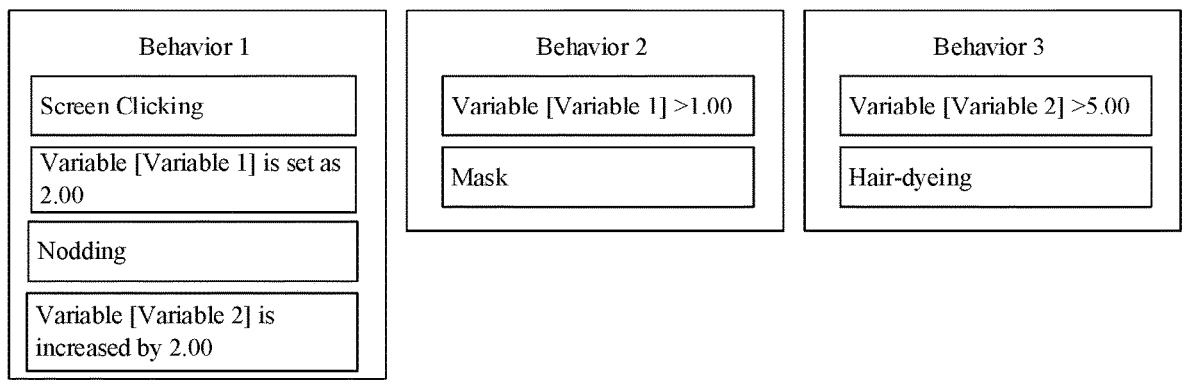
FIG. 5 is a schematic diagram of a making interface of a video special effect configuration method provided by an embodiment.

FIG. 5 is a schematic diagram of a making interface of a video special effect configuration method provided by an embodiment.

Two trigger actions such as screen clicking and nodding in the first special effect event combination "Behavior 1" are arranged in sequence. The trigger actions are detected and acquired according to the arrangement order of the trigger action nodes, and whether corresponding trigger action nodes can be triggered is determined according to the occurrence of the trigger actions and the arrangement order of the trigger action nodes. More specifically, only the trigger action of screen clicking can trigger the trigger action node in the special effect event combination 1 for the first time. The trigger action node "screen clicking" is acquired in the first special effect event combination "Behavior 1" according to the acquired trigger action of screen clicking, so that the target variable of the "screen clicking" trigger action node can be changed according to the trigger action, e.g., increased by 1. After this process, the "nodding" trigger action node can only be acquired from the first special effect event combination "Behavior 1" when the occurrence of the nodding trigger action is recognized, so that the target variable of the "nodding" trigger action node is changed. However, the above execution process is independent of the trigger process of the trigger action node on corresponding video special effect. That is to say, the variable value of the second trigger action node "nodding" can be acquired according to the nodding trigger action as long as the target variable of the first trigger action node "screen clicking" is changed due to the trigger action of screen clicking.

In the embodiment, corresponding trigger action nodes are triggered in sequence based on the occurrence of the trigger actions according to the arrangement order of the trigger action nodes obtained from the first special effect event combination "Behavior 1", and different variable trigger nodes in the second special effect event combination "Behavior 2" are triggered in sequence according to the comparison result between the target variables and the determination range obtained in sequence. Therefore, different special effect event combinations can be correlated, and video special effects of the trigger actions corresponding to different variable trigger nodes can be set, thereby further enriching the display effect of the video special effects obtained by the generated configuration file.

Figure 6:
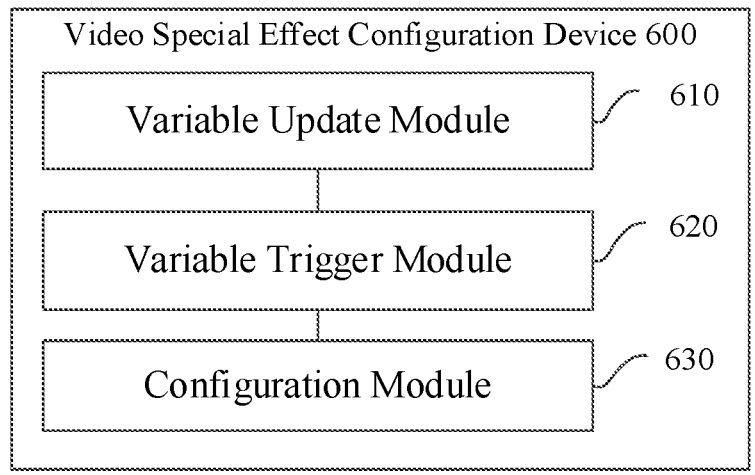
FIG. 6 is a structural schematic diagram of a video special effect configuration device provided by an embodiment.

FIG. 6 is a structural schematic diagram of a video special effect configuration device provided by an embodiment.

The present disclosure provides a video special effect configuration device. As shown in FIG. 6, the video special effect configuration device 600 may comprise:

a variable update module 610 which is configured to add a variable update node in a first special effect event combination in response to a first setting operation of a user, in which the update manner of a target variable is set on the variable update node;

a variable trigger module 620 which is configured to add a variable trigger node in a second special effect event combination in response to a second setting operation of the user, in which a judging condition of the target variable is set on the variable trigger node; and a configuration module 630 which is configured to generate configuration file of a video special effect according to the first special effect event combination and the second special effect event combination.

Wherein, the configuration file is used for indicating the display of the video special effect on a target video: in the display process of the video special effect, the target variable is updated according to the update manner when the first special effect event combination is executed to satisfy the variable update node, and the second special effect event combination is triggered and executed by taking the variable trigger node as a starting point when the target variable satisfies the judging condition.

The embodiment of the present disclosure provides a possible implementation method. The variable trigger module 630 is configured to determine whether the target variable satisfies the judging condition if the target variable is updated in the display process of the video special effect.

The embodiment of the present disclosure provides a possible implementation method. The update manner of the target variable of the variable update module 620 may be specifically that: the target variable is set as a first fixed value.

The embodiment of the present disclosure provides a possible implementation method. The update manner of the target variable of the variable update module 620 may be specifically: accumulating or subtracting a second fixed value from the target variable.

The video special effect script generation device 600 connects the variable update node and the variable trigger node according to the same target variable by utilization of the addition of the setting of the update manner and the setting of the judging condition on the same target variable on the variable update node and the variable trigger node respectively, so as to correlate the first special effect event combination and the second special effect event combination provided with the variable update node and the variable trigger node. Therefore, in the display process of the video special effect, the display manner of the video effect is updated according to the update of the target variable, and the transformation manner of the video special effect is added, which is favorable for developing the making space of the video special effect and helpful for improving the enthusiasm of the users in video recording.

Figure 7:
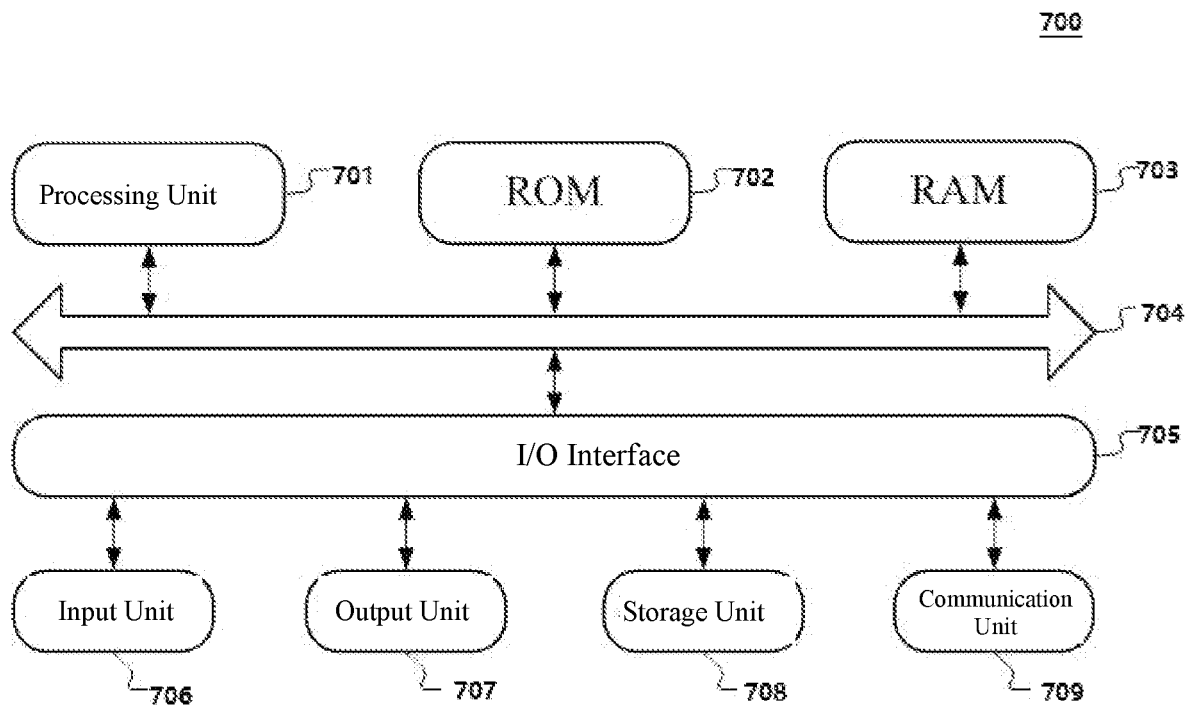
FIG. 7 is a structural schematic diagram of an electronic device for video special effect configuration provided by an embodiment.

Referring to FIG. 7, FIG. 7 is a structural schematic diagram of an electronic device for video special effect script generation provided by an embodiment, which shows the structural schematic diagram of an electronic device 700 for implementing the embodiment of the present disclosure. The electronic device 700 in the embodiment of the present disclosure may include but not limited to mobile terminals such as mobile phone, laptop, digital radio receiver, personal digital assistant (PDA), portable android device (PAD), portable multimedia player (PMP) and car terminal (such as car navigation terminal) and fixed terminals such as digital TV and desktop computer. The electronic device as shown in FIG. 7 is only an example and should not restrict the functions and the scope of use of the embodiments of the present disclosure.

The electronic device 700 comprises: a memory and a processor, wherein the processor herein may be hereinafter referred to as a processing unit 701, and the memory may include at least one of a read-only memory (ROM) 702, a random-access memory (RAM) 703 and a storage unit 708 as described below, with the details as follows:

As shown in FIG. 7, the electronic device 700 may comprise the processing unit (e.g., a central processing unit (CPU), a graphics processing unit (GPU)) 701, which may execute various appropriate actions and processing according to programs stored in the ROM 702 or programs loaded to the RAM 703 from the storage unit 708. A plurality of programs and data required for the operation of the electronic device 700 are also stored in the RAM 703. The processing unit 701, the ROM 702 and the RAM 703 are connected with each other through a bus 704. An input/output (I/O) interface 705 is also connected to the bus 704.

In general, the following units may be connected to the I/O interface 705: input units 706 including a touch screen, a touch pad, a keyboard, a mouse, a camera, a microphone, an accelerometer, a gyroscope and the like; output units 707 including a liquid crystal display (LCD), a loudspeaker, a vibrator and the like;

storage units 708 including magnetic tapes and hard disks; and a communication unit 709. The communication unit 709 may allow the electronic device 700 to communicate wirelessly in a wired manner with other devices to exchange data. Although FIG. 7 shows the electronic device 700 comprising a plurality of units, it should be understood that not all the shown units are required to be implemented or included. More or less units may be implemented alternatively or included.

Particularly, according to the embodiments of the present disclosure, the processes described above with reference to the flowcharts may be implemented as computer software programs. For instance, the embodiment of the present disclosure provides a computer program product, which comprises computer programs hosted on a non-transient computer readable medium. The computer programs contain program codes for executing the method as shown in the flowchart. In the embodiment, the computer programs may be unloaded and installed from the internet through the communication unit 709, or installed from the storage unit 708, or installed from the ROM 702. The above functions defined in the method provided by the embodiment of the present disclosure are executed when the computer programs are executed by the processing unit 701.

It should be noted that the above computer readable medium of the present disclosure may be a computer readable signal medium, a computer readable storage medium, or any combination of the above. The computer readable storage medium, for instance, may be, but not limited to, electrical, magnetic, optical, electromagnetic, infrared, or semiconductor system, device, or equipment, or a combination of the above. A more specific example of the computer readable storage medium may include but not limited to: electrical connection having one or more wires, portable computer disk, hard disk, RAM, ROM, erasable programmable read-only memory (EPROM), flash memory, optical fiber, portable compact disk read-only memory (CD-ROM), optical storage unit, magnetic storage unit, or any suitable combination of the above. In the present disclosure, the computer readable storage medium may be any tangible medium containing or storing programs. The programs may be used by a command execution system, device or unit or used in combination with the command execution system, device or unit. However, in the present disclosure, the computer readable signal medium may include data signals propagated in baseband or as part of carrier, wherein computer readable program codes are hosted. The propagated data signals may adopt a plurality of forms, including but not limited to electromagnetic signals, optical signals or any suitable combination of the above. The computer readable signal medium may also be any computer readable medium except the computer readable storage medium. The computer readable signal medium can send, propagate or transmit programs used by the command execution system, device or unit or used in combination with the command execution system, device or unit. The program codes contained in the computer readable medium can be transmitted by any appropriate medium, including but not limited to: wire, optical cable, radio frequency (RF) and the like, or any suitable combination of the above.

In some embodiments, the client and the server may communicate by utilization of any network protocol which is currently known or developed in the future such as hypertext transfer protocol (HTTP), and may be interconnected with digital data communication (e.g., communication network) in any form or medium. The example of the communication network includes local area network (LAN), wide area network (WAN), internet, end-to-end network (e.g., ad hoc end-to-end network), and any network which is current known or developed in the future.

The above computer readable medium may be contained in the above electronic device and may also exist alone and not be assembled into the electronic device.

The above computer readable medium hosts one or more programs. When the above one or more programs are executed by the electronic device, the electronic device is configured to: adding a variable update node in a first special effect event combination in response to a first setting operation of a user, in which an update manner of a target variable is set on the variable update node; adding a variable trigger node in a second special effect event combination in response to a second setting operation of the user, in which a judging condition of the target variable is set on the variable trigger node; generating a configuration file of a video special effect according to the first special effect event combination and the second special effect event combination, the configuration file is used for indicating displaying of the video special effect on a target video: in a displaying process of the video special effect, the target variable is updated according to the update manner when the first special effect event combination is executed to satisfy the variable update node, and the second special effect event combination is triggered and executed by taking the variable trigger node as a starting point when the target variable satisfies the judging condition Computer program codes for performing the operations of the present disclosure may be written in one or more programming languages or a combination thereof. The above programming languages include but not limited to object-oriented programming languages such as Java, Smalltalk and C++, and also include conventional procedural programming languages such as "C" language or similar programming languages. The program codes may be completely executed on a user computer, partially executed on the user computer, executed as a separate package, partially executed on the user computer and partially executed on a remote computer, or completely executed on the remote computer or the server. In the case when the remote computer is involved, the remote computer may be connected to the user computer through any kind of network including LAN or WAN, or can be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram may represent a module, a program segment, or a part of code. The module, the program segment, or the part of the code contains one or more executable instructions for implementing specified logic functions. It should be also noted that in some alternative implementations, the functions marked in the blocks may also occur in a different order from those marked in the drawings. For instance, two consecutive blocks may actually be executed basically in parallel, and sometimes, may also be executed in a reverse order, determined by involved functions. It should be also noted that each block in the block diagram and/or flowchart and the combination of the blocks in the block diagram and/or the flowchart may be implemented by a dedicated hardware-based system that performs a specified function or operation, and may also be implemented by the combination of a special hardware and computer instructions.

Modules or units involved in the embodiments of the present disclosure may be implemented by software, and may also be implemented by hardware. Wherein, the name of the module or the unit should not define the unit under certain circumstances. For instance, the theme resource package acquisition request sending module may also be described as "a module for sending a theme resource package acquisition request".

The functions described above in this document may be at least partially executed by one or more hardware logical units. For instance, without limitation, demonstration type hardware logical units that may be used include: field programmable gate array (FPGA), application-specific integrated circuit (ASIC), application specific standard parts (ASSP), system on a chip (SOC), complex programmable logic device (CPLD), etc.

In the context of the present disclosure, the machine readable medium may be a tangible medium and may include or store programs used by command execution system, device or equipment or used in combination with the command execution system, device or equipment. The machine readable medium may be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on one or more wires, portable computer disk, hard disk, RAM, ROM, EPROM, flash memory, optical fiber, CD-ROM, optical storage unit, magnetic storage unit, or any suitable combination of the above.

According to one embodiment or a plurality of embodiments of the present disclosure, a video special effect configuration method is provided, the video special effect configuration method comprises the following steps:
  adding a variable update node in a first special effect event combination in response to a first setting operation of a user, in which an update manner of a target variable is set on the variable update node;
  adding a variable trigger node in a second special effect event combination in response to a second setting operation of the user, in which a judging condition of the target variable is set on the variable trigger node;
  generating a configuration file of a video special effect according to the first special effect event combination and the second special effect event combination,
  wherein the configuration file is used for indicating displaying of the video special effect on a target video: in a displaying process of the video special effect, the target variable is updated according to the update manner when the first special effect event combination is executed to satisfy the variable update node, and the second special effect event combination is triggered and executed by taking the variable trigger node as a starting point when the target variable satisfies the judging condition.

According to one embodiment or a plurality of embodiments of the present disclosure, a video special effect configuration method is provided, the video special effect configuration method comprises the following steps:

in the displaying process of the video special effect, whether the target variable satisfies the judging condition is determined under a condition that the target variable is updated.

According to one embodiment or a plurality of embodiments of the present disclosure, a video special effect configuration method is provided, the video special effect configuration method further comprise:

adding a trigger action node in the first special effect event combination in response to a third setting operation of the user, in which the trigger action node is a previous node of the variable update node.

According to one embodiment or a plurality of embodiments of the present disclosure, a video special effect configuration method is provided, and the update manner is to: set the target variable as a first fixed value.

According to one embodiment or a plurality of embodiments of the present disclosure, a video special effect configuration method is provided, the video special effect configuration method comprises the following steps:

the update manner is to: accumulate or subtract a second fixed value from the target variable.

According to one embodiment or a plurality of embodiments of the present disclosure, a video special effect configuration method is provided, the video special effect configuration method comprises the following steps:

the judging condition is that: the target variable is within a preset value range.

According to one embodiment or a plurality of embodiments of the present disclosure, a video special effect configuration method is provided, the video special effect configuration method comprises the following steps:

in the displaying process of the video special effect, under a condition that the target variable is updated, the updated target variable is displayed.

According to one embodiment or a plurality of embodiments of the present disclosure, a video special effect configuration device is provided, the video special effect configuration device comprises:

a variable update module, configured to add a variable update node in a first special effect event combination in response to a first setting operation of a user, in which an update manner of a target variable is set on the variable update node;

a variable trigger module, configured to add a variable trigger node in a second special effect event combination in response to a second setting operation of the user, in which a judging condition of the target variable is set on the variable trigger node; and a configuration module, configured to generate a configuration file of a video special effect according to the first special effect event combination and the second special effect event combination, wherein, the configuration file is used for indicating displaying of the video special effect on a target video: in a displaying process of the video special effect, the target variable is updated according to the update manner when the first special effect event combination is executed to satisfy the variable update node, and the second special effect event combination is triggered and executed by taking the variable trigger node as a starting point when the target variable satisfies the judging condition.

According to one embodiment or a plurality of embodiments of the present disclosure, a video special effect configuration device is provided:

a variable trigger module, configured to, in the displaying process of the video special effect, determine whether the target variable satisfies the judging condition under a condition that the target variable is updated According to one embodiment or a plurality of embodiments of the present disclosure, a video special effect configuration device is provided:

a variable update module, the manner of updating the target variable thereof is to: set the target variable as a first fixed value.

According to one embodiment or a plurality of embodiments of the present disclosure, a video special effect configuration device is provided:

a variable update module, the manner of updating the target variable thereof is to: accumulate or subtract a second fixed value from the target variable.

According to one embodiment or a plurality of embodiments of the present disclosure, a computer equipment is provided, the computer equipment comprises a memory, a processor and computer programs stored in the memory and capable of running on the processor, and steps of the video special effect configuration method according to the above any embodiment are implemented when the processor executes the programs.

According to one embodiment or a plurality of embodiments of the present disclosure, a storage medium comprising computer executable instructions is provided, the computer executable instructions are used for executing steps of the video special effect configuration method according to the above any embodiment when being executed by a computer processor.

The above description is only the explanation of the better embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable subcombination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

The invention claimed is:

1. A video special effect configuration method, comprising:
adding a variable update node in a first special effect event combination in response to a first setting operation of a user, in which an update manner of a target variable is set on the variable update node, wherein the first special effect event combination further includes a trigger action node, wherein when a trigger action setting of the trigger action node is satisfied, the target variable is acquired;
adding a variable trigger node in a second special effect event combination in response to a second setting operation of the user, in which a judging condition of the target variable is set on the variable trigger node, wherein the second special effect event combination further includes a next node of the variable trigger node, and wherein when the target variable satisfies the judging condition, the next node is continuously executed;
generating a configuration file of a video special effect according to the first special effect event combination and the second special effect event combination,
wherein the configuration file is used for indicating displaying of the video special effect on a target video: in a displaying process of the video special effect, the target variable is updated according to the update manner when the first special effect event combination is executed to satisfy the variable update node, wherein the update manner is to accumulate or subtract a second fixed value from the target variable and the update manner is used for limiting numerical range of the target variable.

2. The video special effect configuration method according to claim 1, wherein in the displaying process of the video special effect, whether the target variable satisfies the judging condition is determined under a condition that the target variable is updated.

3. The video special effect configuration method according to claim 1, further comprising:
adding a trigger action node in the first special effect event combination in response to a third setting operation of the user, in which the trigger action node is a previous node of the variable update node.

4. The video special effect configuration method according to claim 1, wherein the update manner is to: set the target variable as a first fixed value.

5. The video special effect configuration method according to claim 1, wherein the judging condition is that: the target variable is within a preset value range.

6. The video special effect configuration method according to claim 1, wherein in the displaying process of the video special effect, under a condition that the target variable is updated, the updated target variable is displayed.

7. The video special effect configuration method according to claim 2, further comprising:
adding a trigger action node in the first special effect event combination in response to a third setting operation of the user, in which the trigger action node is a previous node of the variable update node.

8. The video special effect configuration method according to claim 2, wherein the update manner is to: set the target variable as a first fixed value.

9. The video special effect configuration method according to claim 3, wherein the update manner is to: set the target variable as a first fixed value.

10. The video special effect configuration method according to claim 2, wherein the update manner is to: accumulate or subtract a second fixed value from the target variable.

11. The video special effect configuration method according to claim 3, wherein the update manner is to: accumulate or subtract a second fixed value from the target variable.

12. The video special effect configuration method according to claim 2, wherein the judging condition is that: the target variable is within a preset value range.

13. The video special effect configuration method according to claim 3, wherein the judging condition is that: the target variable is within a preset value range.

14. The video special effect configuration method according to claim 4, wherein the judging condition is that: the target variable is within a preset value range.

15. The video special effect configuration method according to claim 2, wherein in the displaying process of the video special effect, under a condition that the target variable is updated, the updated target variable is displayed.

16. The video special effect configuration method according to claim 3, wherein in the displaying process of the video special effect, under a condition that the target variable is updated, the updated target variable is displayed.

17. A computer equipment, comprising a memory, a processor and computer programs stored in the memory and capable of running on the processor, wherein steps of the video special effect configuration method according to claim 1 are implemented when the processor executes the programs.

18. A non-transient storage medium comprising computer executable instructions, the computer executable instructions are used for executing steps of the video special effect configuration method according to claim 1 when being executed by a computer processor.

* * * * *